Feb. 22, 1966   E. S. WIESZECK   3,235,999
ELECTRICALLY-ACTUATED FISH LURE
Filed Dec. 20, 1964   2 Sheets-Sheet 1

INVENTOR:
EMIL S. WIESZECK
BY
Dawson, Tilton, Fallon, Lungmus & Alexander
ATT'YS Feb. 22, 1966  E. S. WIESZECK  3,235,999
ELECTRICALLY-ACTUATED FISH LURE
Filed Dec. 20, 1964  2 Sheets-Sheet 2

INVENTOR.
EMIL S. WIESZECK
BY
Dawson, Tilton, Fallon, Lungmus & Alexander
ATT'YS 3,235,999
ELECTRICALLY-ACTUATED FISH LURE
Emil S. Wieszeck, Box 175, Ewens' Lane,
Salem, N.H. 03079
Filed Dec. 20, 1964, Ser. No. 425,669
9 Claims. (Cl. 43—17.1)

This application is a continuation-in-part of my co-pending application, Serial No. 178,111, filed March 7, 1962, and now abandoned.

This invention relates to an electrically-actuated fish-lure, and, more particularly, to fishing apparatus wherein a lure is electrically caused to go through a pattern of distortions to attract fish.

It is a general object of this invention to provide novel fishing apparatus, in particular, a novel lure for fish which is responsive to cyclic interruptions of electrical current so as to provide a fish-like movement in the water, thereby attracting fish to an associated hook.

A more specific object of the invention is to provide a novel lure constructed of dissimilar metals which effect a "bimetal" activity because of dissimilar or differential responses to thermal changes.

Other objects and advantages of the invention may be seen in the details of construction and operation set down in this specification.

The invention will be described in conjunction with the accompanying drawing, in which—

Figure 1:
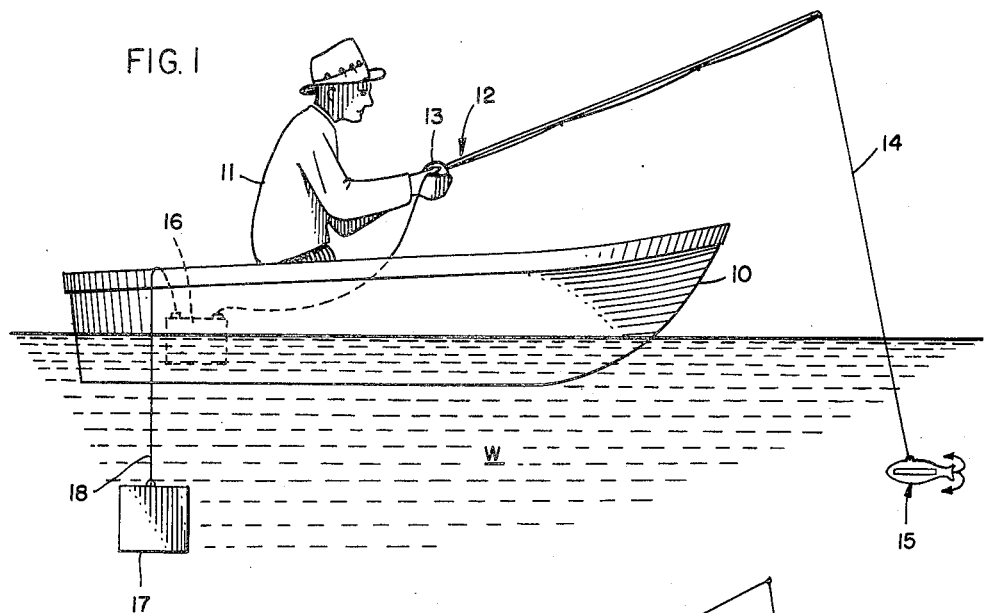
FIG. 1 is an elevational view of fishing apparatus embodying teachings of the invention.
Figure 3:
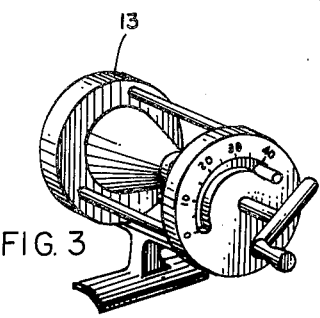
FIG. 3 is a perspective view of a rheostat-equipped reel advantageously employable in the practice of the invention.

In the illustration given and with reference to FIG. 1, the numeral 10 designates a boat in which a fisherman 11 is seated, the fisherman 11 carrying a fishing rod generally designated 12. The rod 12 is equipped with a reel 13 (seen in enlarged form in FIG. 3), a line 14, and a lure generally designated 15.

Figure 2:
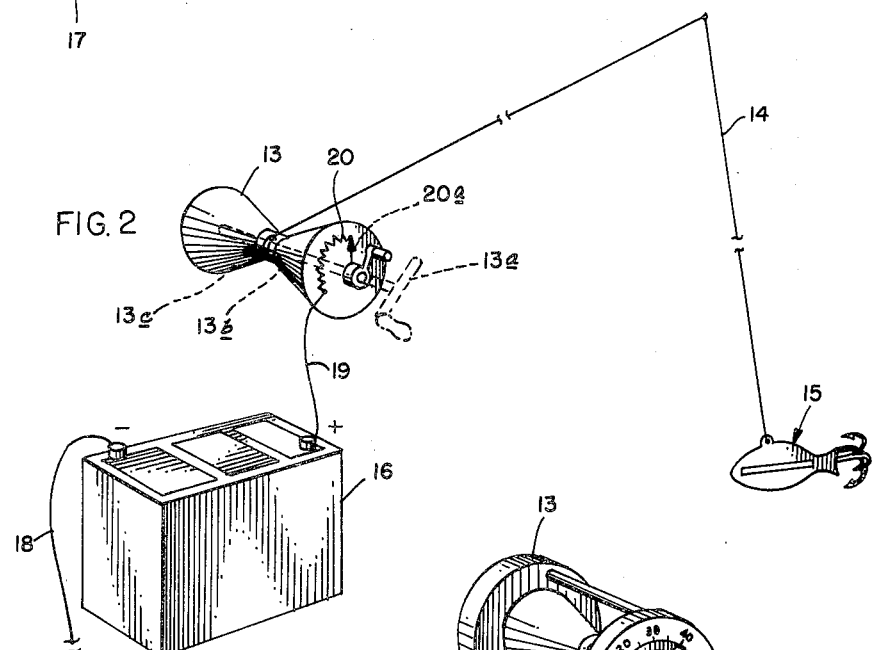
FIG. 2 is a perspective schematic view of the apparatus seen in FIG. 1.

Completing the apparatus employed to electrically energize the lure 15 is a storage battery 16, which is connected to a plate 17 by means of an insulated conductor 18—the foregoing elements 13–18 being seen in schematic form in FIG. 2.

Briefly, the operation of the apparatus seen in FIG. 2 can be summarized as follows:

*General operation*

Current from the battery 16 flows through a conductor 19 (designated only in FIG. 2) to a rheostat 20 on the reel 13. From the rheostat 20, the current flows through the line 14 to the lure 15, and returns to the voltage-generating source through the water W (see FIG. 1), the plate 17, and conductor 18. The current coming through the lure 15 is employed to energize the lure in a manner to be described hereinafter. It will be appreciated that a number of variations can be made in the structures shown and described for energizing the lure. I have found that the invention can be practiced with both casting and spinning reels, for example. In like fashion, there may be variations in the voltage-generating source (shown as the electric storage battery 16) and the collector shown in the form of the plate 17.

Figure 4:
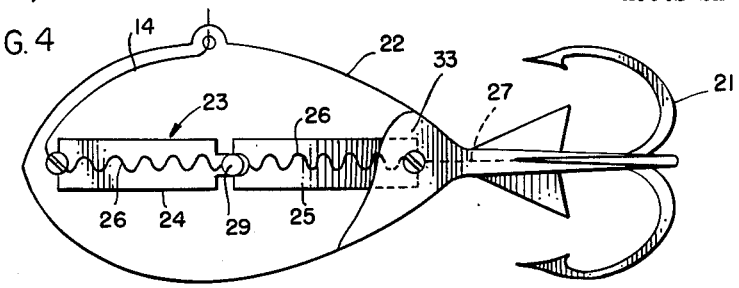
FIG. 4 is an elevational view, partially broken away, of a lure constructed in accordance with the inventive teachings.
Figure 5:
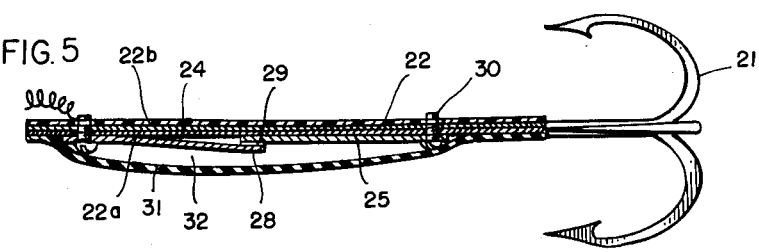
FIG. 5 is a longitudinal sectional view through the lure of FIG. 4 showing the same in one operative condition.
Figure 6:
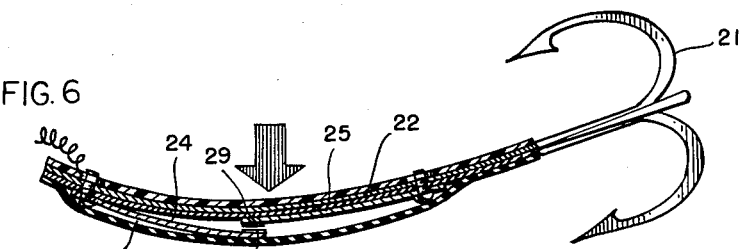
FIG. 6 is a view similar to FIG. 5 but showing the lure in a different operative condition.

To provide a fish-like movement in the lure 15, I utilize a construction such as is seen in FIG. 4. There, the lure 15 is seen to be equipped with a hook 21. This construction is also seen in FIGS. 5 and 6, and a comparison of FIGS. 4 and 5 reveals that the main portion of the lure 15 includes a plate-like body 22. The body is made up of a laminate of dissimilar metals provided in layer form which have a "bimetallic" character. For example, brass 22a and invar 22b may be used. Materials such as these, when arranged in face-to-face, contacting relation, create a body that changes shape with changes in ambient temperature. In other words, with the dissimilar metals there is differential response in sensitivity to thermal changes.

Mounted on one face of the plate-like body 22 is a heater generally designated 23 which is seen to be made up of insulator components 24 and 25 (such as asbestos), each component 24 and 25 having embedded therein a heating element 26. The forward end of the heater 23 is coupled to the line 14, which serves as an electrical conductor, and the rearward end of the heater 23 is coupled to the hook 21 as by means of conductor 27. The two components 24 and 25 overlap each other as at 28 (see FIG. 5), and in this region are equipped with contacts 29 adapted to be disposed in face-to-face, contacting relation.

In the operation of the lure, electrical current enters the heater 23 from the conducting line 14 and flows therethrough, and ultimately into the water W through the hook 21 to return to the voltage-generating source 16 by means of the plate 17 and conducting line 18. After a predetermined time, dependent upon the constitution of the body 22 and the current flowing through the heater 23, the lure changes its shape from that seen in FIG. 5 to that shown in FIG. 6. When the change in shape of the lure occurs, the contacts 29 are open, stopping the flow of current, whereupon the body 22 cools and assumes the FIG. 5 configuration to re-initiate the heating cycle, ultimately resulting in flexure or distortion of the body 22 into the FIG. 6 condition.

One side of the body 22 is covered by an insulating layer as at 30 which may be a plastic applique of vivid coloration. This is effective to prevent corrosion of the body 22. The other side of the body 22 is protected by a relatively resilient plastic sheet 31 which is spaced from the body 22 to define a water-tight chamber 32 which also may have a plastic applique as at 33 (see FIG. 4). The sheet 31 is integrated peripherally with the body 22 to provide the water-tight chamber 32.

Figure 7:
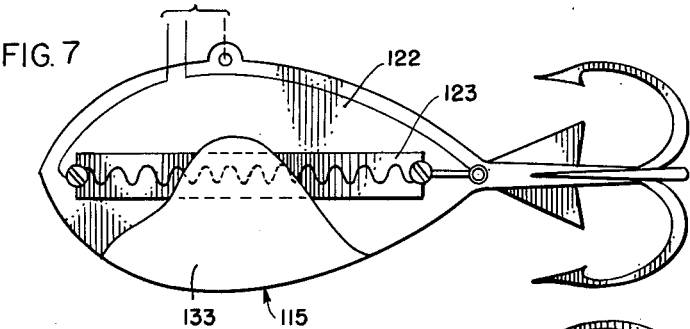
FIG. 7 is a view similar to FIG. 4 but of a modified form of lure.
Figure 8:
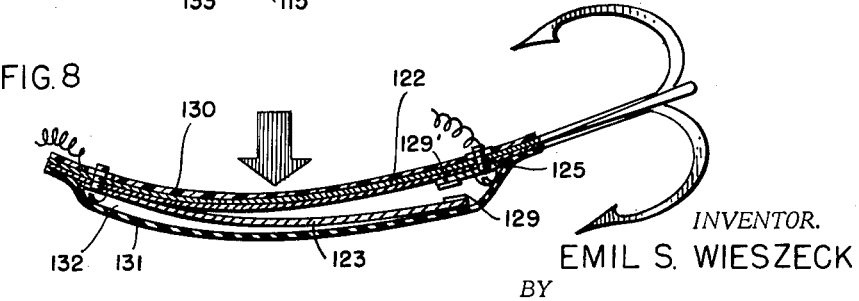
FIG. 8 is a longitudinal sectional view of the modification seen in FIG. 7.

An alternative form of lure is seen in FIGS. 7 and 8, where the plate-like body is designated by the numeral 122, covered by an applique 130 and having a chamber 132 defined by the sheet 131 and applique 133, and is seen to be equipped with a heater 123. The after end of the heater 123 is equipped with a contact as at 129, and an arm 125 is equipped with a mating contact 129'. In this form of the invention, the circuit between the lure 115 and the voltage-generating source is completed by a two-wire conductor 114 which can be provided as part of the line 14 seen in FIG. 1.

Since an electro-chemical action may occur on the body 22, I prefer to pass the current through the heater 23 which is insulated from both the bimetal body 22 as well as from the water. Heat from the heating element 23 causes the bimetal to assume a dished-out configuration, automatically breaking the heating circuit as seen in FIG. 5. As the bimetal cools back to the temperature of the surrounding water, it snaps back to its original configuration, closing the contacts 29 in a snap-acting manner.

In the electrical circuit, it may be advantageous to provide the electrical conductor 114 separate from the actual line 14, although integrated therewith in the event the lure should be too heavy for supporting only by the current-conducting wire or wires, as the case may be. In the case of a single wire coming to the lure, the hook 21 may advantageously provide the discharge point for current into the water W, completing the circuit back to the cathode plate 17. In such a case, a fish biting on the hook 21 would apply an axial force tending to straighten the bimetal plate-like body 22, thereby closing the contacts 29 and allowing the current to pass through the fish. I prefer the contour of hook shown, inasmuch as it has a predetermined area in contact with the water assisted by vanes or fins mounted along its shank so as to readily pass current to the water. As mentioned previously, the body 22 is covered, as with a transparent plastic, to prevent electrochemical action, but this does not extend to the hook. The waterproof plastic enclosure about the lure body prevents water from shorting the contacts 29 when they are in opened condition.

From the foregoing, it will be appreciated that the lure is constructed and arranged to have a relatively "unflexed" configuration when in the temperature range normally encountered in fishing waters. When the thermally-responsive body is heated above that temperature range, it assumes a distorted configuration such as is seen in FIGS. 6 and 8. The time in which this takes place can be varied through the rheostat 20 previously referred to. As shown, the rheostat is built into the reel 13 on the side equipped with the handle 13a. The rheostat 20 is equipped with the usual knob depicted schematically as at 20a. It will be appreciated by those skilled in the art that the rheostat could also include an ammeter and/or a voltmeter of the miniature type to show what is happening in the circuit. By pressing the adjusting knob 20a and thereby selecting new rheostat positions, the rate of heating the lure can be varied so as to control its action in the water. The current entering the rheostat 20, in the illustration given, flows through a shaft 13b into an insulated bushing 13c, from which it then flows into the line 14.

In one example of the invention, I employed approximately 250 feet of neoprene-covered lamp wire. This was connected to a lure constituting the anode and a lead plate one foot square and about 0.050" thick was used as the cathode. The anode and cathode were separated by about 200 feet, with the anode and cathode immersed in ocean water. With 45° F. temperature water and the air temperature at 50° F., I found the following values of current corresponding to different voltages at the voltage generator 16:

| Voltage: | Current, amperes |
|---|---|
| 1½ | 0.22 |
| 22½ | .94 |
| 45 | 1.1 |
| 67½ | 1.2 |
| 90 | 1.3 |
| 112½ | 1.5 |

While, in the foregoing specification, I have set down a detailed description of the invention for the purpose of illustrating the practice thereof to those skilled in the art, many variations in the details herein given may be made by the skilled artworker without departing from the spirit and scope of the invention.

I claim:

1. In fishing apparatus, (A) a plate-like body comprising laminated dissimilar metals differently responsive to thermal changes to alter the body configuration, (B) means on said body for delivering electrical current thereto to increase the temperature of said dissimilar metals and thus change the body configuration, (C) means on said body for coupling hook means thereto, and (D) means associated with said current-delivering means for interrupting the flow of electrical current whereby the environment is adapted to return said body to its unheated configuration.

2. The structure of claim 1 in which said associated means includes a pair of contacts on said body capable of passing electrical current in one configuration of said body and incapable of passing current in another configuration of said body.

3. In fishing apparatus, an electrically distortable lure, comprising (A) a laminated plate-like body comprising metal layers differentially responsive to thermal changes, (B) electrically responsive means on said body insulated therefrom and from water in which said body is immersed for cyclic application of heat to said layers to heat the same above the water temperature, whereby said body is distorted, and (C) means for supplying electrical current to said electrically responsive means.

4. The structure of claim 3 in which said electrically responsive means includes heater means coupled to said current-supplying means and contacts electrically coupled to said heater means, said contacts being openable upon the distortion of said body.

5. In an electrically distortable fish lure, (A) a plate-like body constructed of laminated layers of material differentially responsive to thermal changes, said body having one configuration in the temperature range normally encountered in fishing waters, and (B) electric heater means insulatably secured to said body for cyclically elevating the body temperature above said range to change the configuration of said body.

6. In combination, (A) a voltage-generating source, (B) a reel, (C) conductor means coupling said source and reel, (D) conductor means adjustably wound on said reel and adapted to receive current from said source, and (E) a plate-like lure coupled to said reel conductor means, said lure being constructed of bimetal whereby said lure assumes one configuration when immersed during fishing and free of current from said source, and another configuration when so immersed and receiving current from said source to provide an electrical circuit through water in which said lure is immersed.

7. The combination of claim 6 in which said reel conductor means is a single conductor, and plate means immersed in the water having the lure immersed therein, said plate being electrically connected to said source.

8. In combination, (A) a voltage-generating source, (B) a fishing rod electrically coupled to said source and equipped with a line adjustably wound on said rod, said line being an electrical conductor, and (C) a hook-equipped, plate-like lure secured to the free end of said line, said lure being constructed of a bimetal whereby said lure is actuatable into fish-like motion upon receipt of current through said line, said lure being equipped with electrical contacts coupled to said source, said contacts being arranged to pass current in one configuration of said body but not in another.

9. In an electrically distortable fish lure, a plate-like body constructed of layers of metal material laminated together to provide a unitary member differentially responsive to thermal changes, said body having one arcuate configuration in the temperature range normally encountered in fishing waters, and electrical heater means insulatably secured to said body for cyclically elevating the body temperature above said range to change the arcuate configuration of said body, said body having a fish shape capable of propelling itself through the water, whereby the change in configuration developed by the application of heat automatically propels said body away from heated water into cooler water.

References Cited by the Examiner

UNITED STATES PATENTS

| | | | |
|---|---|---|---|
| 1,838,981 | 12/1931 | Anderson | 43—17.1 |
| 1,906,791 | 5/1933 | Grossmann | 43—26.2 |
| 2,562,685 | 7/1951 | Adams. | |
| 2,687,007 | 8/1954 | Reitz | 60—23 |

SAMUEL KOREN, *Primary Examiner.*